July 14, 1959

B. D. SMITH 2,894,577

SHADE ROLLERS

Filed Feb. 18, 1958

INVENTOR.
BLANCHARD D. SMITH
BY
ATTORNEY

July 14, 1959   B. D. SMITH   2,894,577
SHADE ROLLERS

Filed Feb. 18, 1958   2 Sheets-Sheet 2

INVENTOR.
BLANCHARD D. SMITH

ATTORNEY

United States Patent Office 2,894,577
Patented July 14, 1959

2,894,577
SHADE ROLLERS

Blanchard D. Smith, Atlanta, Ga.

Application February 18, 1958, Serial No. 715,966

11 Claims. (Cl. 160—299)

This invention relates to a cord controlled window shade with friction support and especially to a window shade of that sort further characterized by the absence of the conventional coil spring and ratchet lock coiling and positioning apparatus.

There is a need for a dependable and easy working window shade which does not employ the old coil spring roller tensioning arrangement that often flies out of control or refuses to remain in one set spot. There have been prior art devices which eliminated the coil spring arrangement but the cost of producing and attaching those devices would be noticeably more than the present device. In addition, the positioning apparatus of some of those devices was not positive enough and the shade would "creep" out of position.

Generally described, without regard to scope of invention or complex patent terminology, my invention in one embodiment is made as a small attachment to the end of a conventional shade roller having window shade wound thereon and the shaft or spindle of my attachment simply fits into the center of the roller end. The shaft or spindle of this invention fits tightly and permanently into the shade roller and integrally formed on the shaft is a cord roller hub and a friction positioning drum having rubber teeth around the periphery thereof. An attachment member of my invention is formed with a special attachment lip arrangement for insertion on the conventional slotted shade roller bracket with a cup portion fitting over the friction drum and with an elongated slot fitting over the shaft. The cup has teeth formed therein. A bent leaf type spring is fitted on the cup member and around the shaft to resiliently bring said inner rubber teeth in engagement with the upper teeth in said cup thereby maintaining said roller in a fixed shade position at any height. A cord is wound around the drum and secured in place. In operation, the leaf spring maintains the teeth in engagement to keep the roller in correct position; however, any pull on either the shade or the roller moves the entire shade roller and shaft downwardly relative to the cup which disengages the teeth allowing free pull on the roller. Release of the pull permits the spring to re-engage the teeth at that position.

A primary object of this invention is to provide a shade roller with a control cord and friction means for holding the shade in position but being dis-engageable in response to a pull to re-position the shade.

An additional object of this invention is to provide a friction attachment for a conventional shade roller whereby said attachment mounts in the end of the roller and provides the necessary friction to hold the shade in desired position in the window and being releasable for re-positioning said shade.

A further object of this invention resides in the provision of a positive friction engagement between matching teeth which are readily shifted out of engagement for moving the shade roller.

Another object of this invention is found in the particular arrangement of a support spindle in the end of the shade roller with a friction drum thereon normally held by a spring upwardly in engagements with an outer cup member which is rigidly attached on the wall bracket.

Another important object of this invention is to provide a friction engagement means on the shade that is disengaged simply by the act of pulling downwardly either on the shade or the shade cord forming a part of the friction means, and that is adjusted upwardly by the cord.

Many other objects and advantages of the present invention will be apparent from reading the following specification taken in conjunction with the accompanying drawings, in which.

Figure 1:
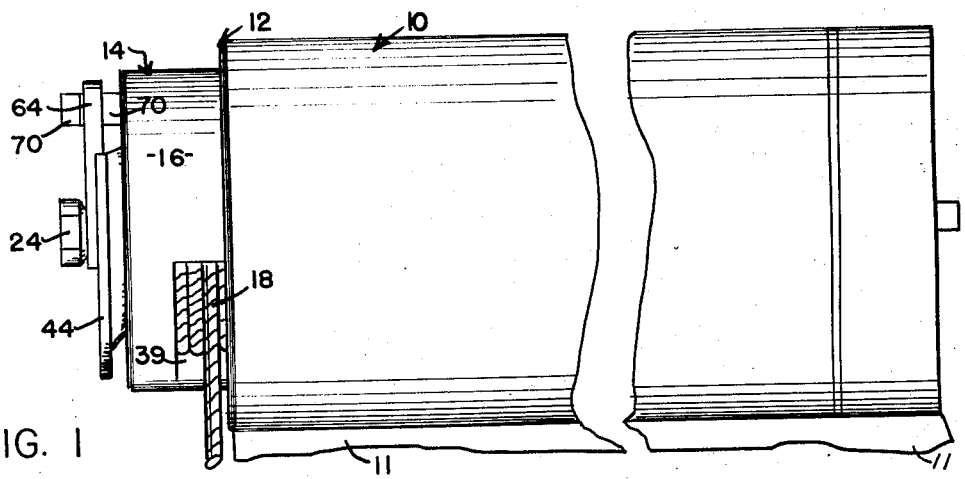
Fig. 1 is a side elevation view of a shade roller having my invention attached at the left hand side thereof and with the center of the roller broken away.
Figure 2:
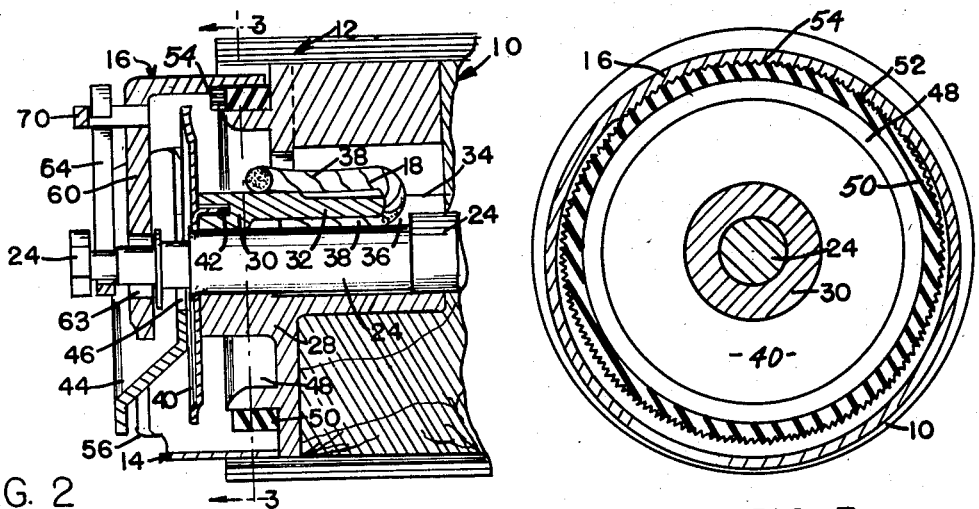
Fig. 2 is a cross-sectional view taken vertically and longitudinally of the roller axis as shown by lines 2—2 in Fig. 5 when the roller is on the wall bracket.
Figure 3:
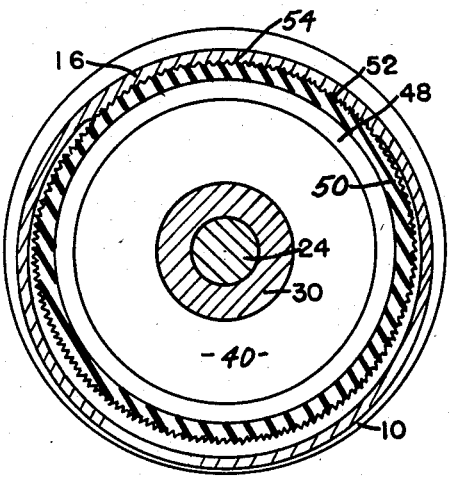
Fig. 3 is a cross-sectional view of this invention taken substantially along the lines 3—3 in Fig. 2.
Figure 4:
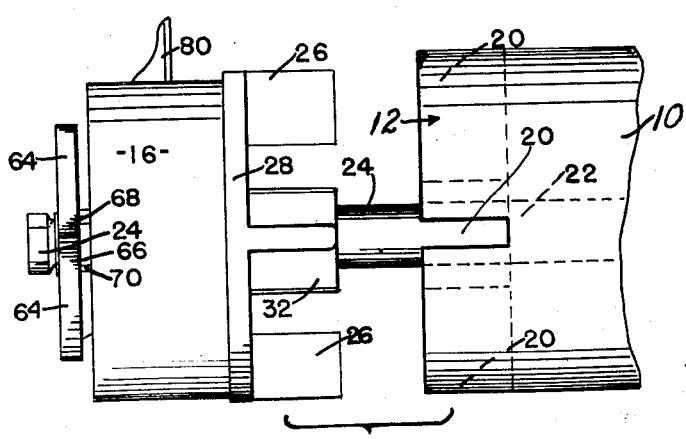
Fig. 4 is a top plan view of the friction attachment being inserted and assembled in the roller end.
Figure 5:
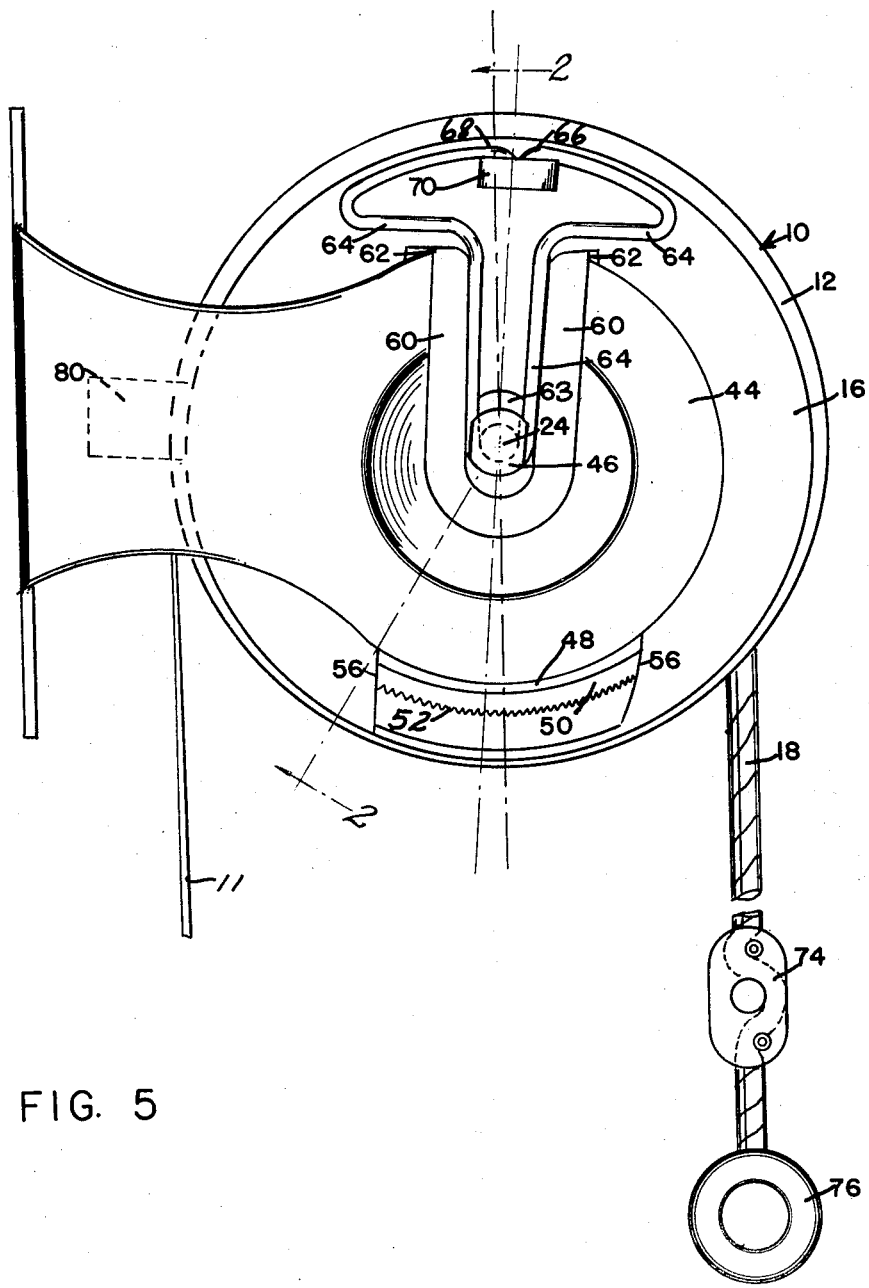
Fig. 5 is a side elevation view of the device of Fig. 1 attached on a wall bracket commonly in use.

Referring to the drawings, in Fig. 1 a wooden shade roller 10 with shade 11 has fitted into the end 12 thereof the present invention 14 which includes an outer cup-like member 16 covering a cord control 18. As seen in Fig. 4, the roller 10 has cross-slots 20 and a counterbored hole 22 to receive the spindle or shaft 24 of attachment 14 and to receive and align guide plates 26 on the shaft in the cross-slots. Plates 26 are formed as integral parts of a hub or drum 28 of plastic or the like which hub is press-fitted onto spindle 24.

Drug 28 is formed with center hub 30 having hub extension fingers 32. One finger 32 is formed with a slot 34 above spindle 34 and leading into an elongated space 36. The end 38 of the cord control 18 is fitted through the slot 34 and pressed into the space 36 between the shaft or spindle 24 and the hub finger 32 during the action of inserting the spindle 24 in the drum. This holds the end of the cord in place. The remainder of the cord 18 has part wound around the drum 28 and hangs outwardly therefrom in continuous fashion through an opening 39 in cup 16. Pressed into the front of hub 30 is a metal or the like cord guide flange or plate 40 with lugs 42 fitting into hub 30. Spindle 24 is enlarged at this portion 42 to hold flange 40 in place. Cord 18 is adjusted in length as described hereinafter.

Spindle 24 extends outwardly from hub 30 beyond a conventional wall bracket 44 with slot 46. Hub 30 has a flanged portion 48 on which is pressed a friction band 50 of rubber or the like and having peripheral teeth 52 formed thereon. Supported normally in engagement with said teeth 52 on flange 48 is the cup-like member 16 and housing over the control cord 18. Member 16, which may be die cast metal, is formed internally thereof for an arc of about 60 degrees at the top inside periphery with teeth 54 normally meshing in engagement with teeth 52 of band 50. The front part of cup member 16 is formed with an inner lip 56 fitting behind conventional shade bracket 44 and with spaced outer lips 60 fitting in front of the conventional bracket 44. The top of the inner lip 56 and outer lips 60 merge at upper edge 62 over the edge of bracket 44 and at the slot 46. With this arrangement, lips 56, 60 fit right over the slotted edges of bracket 44 at slot 46 to hold the entire shade roller 10 thereon.

The front cup member 16 is formed with an elongated spindle slot 63 through which spindle 24 extends and in which spindle 24 has limited vertical movement. A T-shape, bent, leaf spring 64 is attached around spindle 24 and bends with its top ends 66, 68 hooked into a U-shape bracket 70 formed on the front of cup member 16. Spring 64 pulls and lifts spindle 24, hub 30, drum 28 and friction member band 50 into engagement with the inner teeth 54 of cup 16. In this position, the shade roller 10 axis and axis of spindle 24 (being higher), is non-concentric with cup member 16; and in this position, shade roller 10 is locked against rotational movement. Therefore, there is relative movement vertically between the roller, spindle 24 and the cup 16, bracket 44 assembly.

When it is desired to move the shade roller 10, a pull is given either to cord control 18 or on the shade itself. This action moves spindle 24 and roller 10 downwardly in slot 63 thereby bringing spindle 24 axis into substantially concentric position with cup 16 axis. In this freed position, the roller 10 will roll freely upwardly or downwardly. When released, the spring 64 again returns the inner teeth 52 of band 50 on hub flange 48 into engagement with the teeth 54 of cup 16. This locks the shade roller 10 in new position.

A cord clip 74 is adjusted and slid on the cord 18 to the proper position according to the length of shade desired to be unrolled as a maximum. Clip 74 will engage the cup 16 at opening 39 whenever the ultimate desired length of shade has been unrolled. This is a matter of adjusting the shade to the particular window. After this is done there will be sufficient turns of cord 18 on the drum 28 to wind the shade back up as far as desired. In setting the shade length, a couple of extra turns of shade would be left on the roller at full extension just to cover the bar roller and to prevent tension where the shade is tacked to the roller. Some length of cord 18 would be left below clip 74 and the bottom end of cord 18 could have a conventional shade roller pull ring 76 thereon.

To review the operation of the device, the entire apparatus as a unit consisting of cup 16, shaft or spindle 24, guide plates 26, spring 64 and other parts is pre-assembled and inserted in the end of a conventional shade roller 10 that has been pre-drilled and slotted at the end 12 thereof to receive spindle 24 therein. After assembly the cup member 16 is fitted on a conventional bracket 44 by fitting the lips 56 behind (inside) the bracket and the lips 60 in front of (outside) the bracket 44 at the slot 46 formed in bracket 44. This places cup 16 in firm engagement with bracket 44 to remain thereon. Spring 64 resiliently attaches cup assembly 16 with spindle assembly 24 and is bent normally to hold teeth 52 in engagement with teeth 54. However, since spindle 24 is relatively movable against spring 64 in slot 63, a pull on roller 10 (as by pulling shade 11) will pull teeth 52 out of engagement with teeth 54 to place drum 28 and spindle 24 axis substantially concentric with cup 16 axis thereby permitting smooth rolling of shade roller 10. To keep the shade in proper alignment and to prevent the shade 11 from being rolled too far to one side, a guide arm 80 is provided on cup 16 to bear on the shade edge.

While I have shown and described a preferred embodiment of my invention in working detail, this is not to be construed as the only form thereof and will not be considered as any limitation whatever on the latitude of invention, since various alterations, modifications, eliminations, substitutions, and changes may be made in the embodiment shown without departing from the scope of invention defined in the appended claims.

I claim:

1. In a shade roller to be supported on a rigidly mounted bracket, a shade roller, a roller shaft on one end of said roller for rotation with said roller, a first friction means mounted on said shaft for rotation therewith, a bracket attachment member adapted to be attached to the mounted bracket, second friction means on said bracket attachment member engageable when said shade is at rest with said first friction means, resilient means between said roller shaft and said bracket attachment member normally resiliently and movably mounting said first and said second friction means in engagement with each other thereby preventing movement of said roller relative to the mounting bracket, said resilient means being flexible in response to movement of said shade roller to disengage said first and second friction means so that said roller can be rolled to adjust said shade height, said friction means returning to engagement at selected position to hold said roller in place.

2. In a shade roller to be supported between rigidly mounted brackets on a wall or the like, a shade roller having a shade wound thereon for extension and retraction therefrom, a shaft fixed on and protruding from one end of said roller adjacent the bracket at that end, a first friction means mounted on said bracket adjacent to and adapted to cooperate with said shaft end, means mounting said shaft end for movement on said friction means, second friction means on said shaft end engageable with said first friction means, and releasable means resiliently urging said first and second friction means into engagement with each other, said releasable means being operable by hand to disengage said friction means to permit said shade to be adjusted.

3. In a shade roller to be supported between rigidly mounted brackets on a wall or the like, a shade roller having a shade wound therein for extension and retraction therefrom, a spindle fixed on one end of said shade roller, a control cord wound about said spindle for re-winding said shade by tangential unwinding and being re-wound about said spindle each time said shade is unwound, a first friction surface fixed on said spindle for movement therewith, a second friction surface adapted to be mounted on the wall bracket adjacent the end of said spindle, mounting means mounting said second friction surface movably on said spindle for friction engagement with said first friction surface thereon and for relative movement therebetween, and pressure means forcing said first and second friction surfaces into engagement when said shade is at rest to position said shade in a fixed amount of extension, said pressure means responding to the pull of the hand to disengage said friction surfaces to permit said shade to be re-positioned on said roller thereby to adjust the height thereof.

4. In a shade roller to be supported between rigidly mounted brackets on a wall or the like, and to be adjusted vertically thereon, a shade roller having a shade wound thereon for extension and retraction therefrom, a shaft mounted in one end of said roller and extending outwardly therefrom, a control cord wound about said shaft for tangential unwinding therefrom to re-wind said shade when unwound from said roller, said shade acting to re-wind said cord on said shaft when said shade is unwound, a friction means adapted to be attached on said wall bracket adjacent said shaft end, a friction engagement surface attached on said shaft for normal engagement with said friction means on said bracket to retain said shade in set position, means mounting said friction engagement surface for relative movement with respect to said shaft whereby said shaft is displaced to disengage said friction surfaces, and resilient means connecting said shaft and said friction means on said bracket, said resilient means being interposed between said shaft and said friction surface to force under pressure said friction surfaces resiliently and detachably in engagement with each other.

5. In a shade roller for mounting on a wall or the like, a shade roller, a spindle member fixed on one end of said roller, a cord winding drum mounted for rotation with said spindle, a shade cord having one end thereof fixed to said roller and the other end thereof wound around said drum and hanging free therefrom, an arcuate friction member mounted for rotation with said winding drum, an attachment member having a friction surface thereof movably engageable with said friction member, said spindle being mounted for limited movement in said attachment member, spring means mounted between said spindle member and said attachment member and normally resiliently mounting said friction surface in engagement with said friction member thereby preventing relative movement between said drum and said attachment member, and attachment means on said attachment member for attachment to conventional shade wall bracket or the like to hold said attachment member stationary therewith, whereby said spring normally holds said shade in position but a slight force on said shade or cord disengages said friction surfaces and permits said shade to be adjusted to an exact position.

6. The device of claim 5 wherein said friction member is a circular rubber band and said friction surface is on the inside periphery of said attachment member, and said spring is bent around said spindle and attached to said attachment member.

7. In a shade roller having a window shade thereon and adapted to be attached to a rigid wall bracket, a shade roller, a drum member mounted for rotation on said roller member, a cord winding portion on said drum, a friction surface on the periphery of said drum, a cord member having one end thereof fixed in place on said roller and the other end thereof wound about the cord wind portion of said drum, said cord member hanging downwardly from said roller end, an attachment member mounted with part thereof over said drum cord winding portion with said cord extending outwardly therefrom, a friction engagement portion formed on said attachment member at the inside thereof, a spring member bent about and attached to said drum and to said member to resilinetly connect said attachment member to said drum, said spring normally engaging said friction on both said attachment and said drum to prevent rotation of said shade roller, and attachment means formed on said attachment member for fitting over and attachment on the slot in a conventional shade bracket.

8. In a shade roller having a window shade thereon and adapted to be attached to a rigid wall bracket, a shade roller, a spindle member mounted in said roller end a friction ring attached to the spindle and having a friction surface formed on the periphery thereof, said spindle extending outwardly from said roller beyond said roller end, a cord member having one end thereof fixed in place between said spindle and said roller and the other end thereof wound about a portion of said spindle, said cord member hanging downwardly from said roller end, a housing member mounted over said spindle and over said cord winding portion with cord extending outwardly therefrom, a friction engagement portion formed on said cup member at the inside thereof, a friction surface formed on said friction portion and being complementary with and normally positioned over said friction ring, a spring member resiliently attaching said spindle, and said housing member to resiliently mount said housing on said spindle, said spring normally engaging said friction means on both said housing and said ring to prevent rotation of said shade roller, and attachment means on said housing for attachment on the conventional shade bracket, said flexible spring permitting dis-engagement of said friction means so that said roller will rotate by hand.

9. In a shade roller having a window shade thereon and adapted to be attached to a rigid wall bracket, a shade roller, a spindle member on said roller, a drum member mounted on said spindle member, a rubber friction ring attached on the periphery of said drum and having friction on the periphery thereof, said spindle extending outwardly from said roller beyond said roller end, a cord member having one end thereof fixed in place on said roller and the other end thereof wound about a portion of said drum, said cord member hanging downwardly from said roller end, a housing member mounted over said spindle and over part of said drum cord winding portion with said cord extending outwardly therefrom, a friction engagement portion formed on said housing member at the inside thereof, friction means formed on said friction portion and being normally positioned over said friction ring, a spring member bent about and engaging said spindle and attaching to said housing member to resiliently connect said housing on said spindle, an elongated slot in said cup housing in which said spindle fits for relative movement, said spring normally engaging said housing friction portion and said ring to prevent rotation of said shade roller, attachment means on said housing for attachment on the slot in a conventional shade bracket.

10. In a shade roller having a window shade thereon and adapted to be attached to a rigid wall bracket, a shade roller having a hole bored in one end thereof and having radial slots therein about said hole, a spindle member, a drum member mounted on said spindle member, radial alignment plates attached to said drum member and being insertable in said radial slots in said roller as said spindle is inserted into said bored hole for mounting said drum and spindle in said roller, a friction means on the said drum, said spindle extending outwardly from said roller beyond said roller end, a cord member having one end thereof fixed on said roller and the other end thereof wound about a portion of said drum, said cord member hanging downwardly from said roller end, a housing member mounted over said spindle and over said drum cord winding portion with said cord extending outwardly therefrom, a friction engagement portion formed on said housing member at the inside thereof, a spring member about and engaging said spindle with said cup member to resiliently connect said housing on said spindle, an elongated slot in said cup housing in which said spindle fits for relative movement, said spring normally engaging said friction engagement portion and said ring to prevent rotation of said shade roller, and attachment means on said housing for attachment on the slot in a conventional shade bracket.

11. In a shade roller having a window shade thereon and adapted to be attached to a rigid wall bracket, a shade roller having a hole bored in one end thereof and having radial slots therein about said hole, a spindle member, a drum member mounted on said spindle member, radial alignment plates attached to said drum member and being insertible in said radial slots in said roller as said spindle is inserted into said bored hole for mounting said drum and spindle in said roller, a rubber friction ring attached on the periphery of said drum and having friction teeth formed on the periphery thereof, said spindle extending outwardly from said roller beyond said roller end, a cord member having one end thereof fixed in place between said spindle and said roller and the other end thereof wound about a portion of said drum, said cord member hanging downwardly for tangential unwinding from said roller end, a cord guide plate member mounted on said spindle and attached to said drum member, a cup housing member mounted over said spindle and over said drum cord winding portion with said cord extending outwardly therefrom, a friction engagement portion formed on said cup member at the inside thereof, friction teeth formed on said friction portion and being normally positioned over said friction ring, a leaf spring member bent about and engaging said spindle and attaching to said cup member to resiliently connect said cup housing on said spindle, an elongated slot in said cup housing in which said spindle fits for relative movement, said spring normally engaging said teeth on both said cup and said ring to prevent rotation of said shade roller, attachment lips formed on said cup housing for fitting over and attachment on the slot in a conventional shade bracket.

No references cited.